(12) United States Patent
Bosserdet, Jr.

(10) Patent No.: US 7,621,815 B2
(45) Date of Patent: Nov. 24, 2009

(54) FLEXIBLE CLUTCH

(75) Inventor: James R. Bosserdet, Jr., Old Fort, TN (US)

(73) Assignee: Radio Systems Corporation, Knoxville, TN (US)

( * ) Notice: Subject to any disclaimer, the term of this patent is extended or adjusted under 35 U.S.C. 154(b) by 332 days.

(21) Appl. No.: 11/671,844

(22) Filed: Feb. 6, 2007

(65) Prior Publication Data

US 2008/0188315 A1 Aug. 7, 2008

(51) Int. Cl.
*F16D 7/04* (2006.01)
(52) U.S. Cl. ....................................... 464/37
(58) Field of Classification Search ............. 464/30, 464/37, 41, 78; 192/56.61; 403/223; 119/484
See application file for complete search history.

(56) References Cited

U.S. PATENT DOCUMENTS 5,000,721 A * 3/1991 Williams ................. 464/37

6,508,140 B2 * 1/2003 Zaps ..................... 464/37 X

FOREIGN PATENT DOCUMENTS

CA 532026 * 10/1956 ............. 464/37

* cited by examiner

*Primary Examiner*—Greg Binda
(74) *Attorney, Agent, or Firm*—Pitts & Brittian, PC

(57) ABSTRACT

A clutch is provided for releasably coupling an axially rotatable driving shaft to a coaxial driven shaft. The clutch comprises a gear, having a plurality of cogs, coaxially secured to one of said driving shaft or said driven shaft; and a receptor coaxially secured to the other of said driving shaft or said driven shaft. The receptor comprises a hub and a plurality of flexible extension segments defining a cavity matingly engaging the gear cogs. When the driven shaft encounters rotational resistance greater than a range of normal operation, the extension segments flex out of engagement with the gear cogs to allow rotation of the driving shaft without rotation of the driven shaft.

4 Claims, 2 Drawing Sheets

FLEXIBLE CLUTCH

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to a flexible clutch for releasably coupling an axially rotatable driving shaft to a coaxial driven shaft.

More particularly, this invention pertains to a flexible clutch adapted to disengage an axially rotating driving shaft from a coaxial driven shaft when the driven shaft encounters resistance to rotation which is greater than the torque required for operation in a normal mode.

2. Description of the Related Art

In the field of pet doors it is generally desirable to provide a pet door which is lockable to prevent entry by animals other than the pets for which entry is desired, i.e. wild animals and pets other than those expected to have access to a house. One means for providing such a lockable door is to provide a door which is movable in a vertical direction into and out of a channel adapted to receive the outer edges of the door. When the door is engaged in the channel, it is prevented from pivoting about a horizontal axis. However, when the door is raised from the channel and thus released from the channel, it is free to pivot about a horizontal axis and allow free entry for a pet. One mechanism for effecting such vertical motion is to provide a selectively rotatable shaft which can be reversed in rotation to raise and lower the pet door by means of a gearbox.

One area of concern, however, is that a child may place a hand in the path of the door as it is driven into the channel. Alternatively, a pet may have a tail or paw in the path of the door as it is driven into the channel. Accordingly, it is desirable to provide a mechanism whereby the driving force to insert the door into the channel is reduced when the door encounters a resistive force which is greater than the torque required to insert the door into the channel in normal operation.

BRIEF SUMMARY OF THE INVENTION

According to one embodiment of the present invention, a gear having a plurality of cogs is secured to an end of a driving shaft. A mating receptor is secured to an end of a driven shaft which is coaxial with the driving shaft. The receptor includes a hub for attachment to the driven shaft and a plurality of flexible extension segments which extend from the hub toward the driving shaft and generally parallel thereto. Each of the extension segments includes a shoulder which engages one of the cogs of the gear. The flexibility of the extension segments is adapted so that if the driven shaft encounters resistance to rotation greater than the range for normal operation, the extension segments flex outwardly from the gear, allowing rotation of the gear and driving shaft without effecting rotation of the driven shaft.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
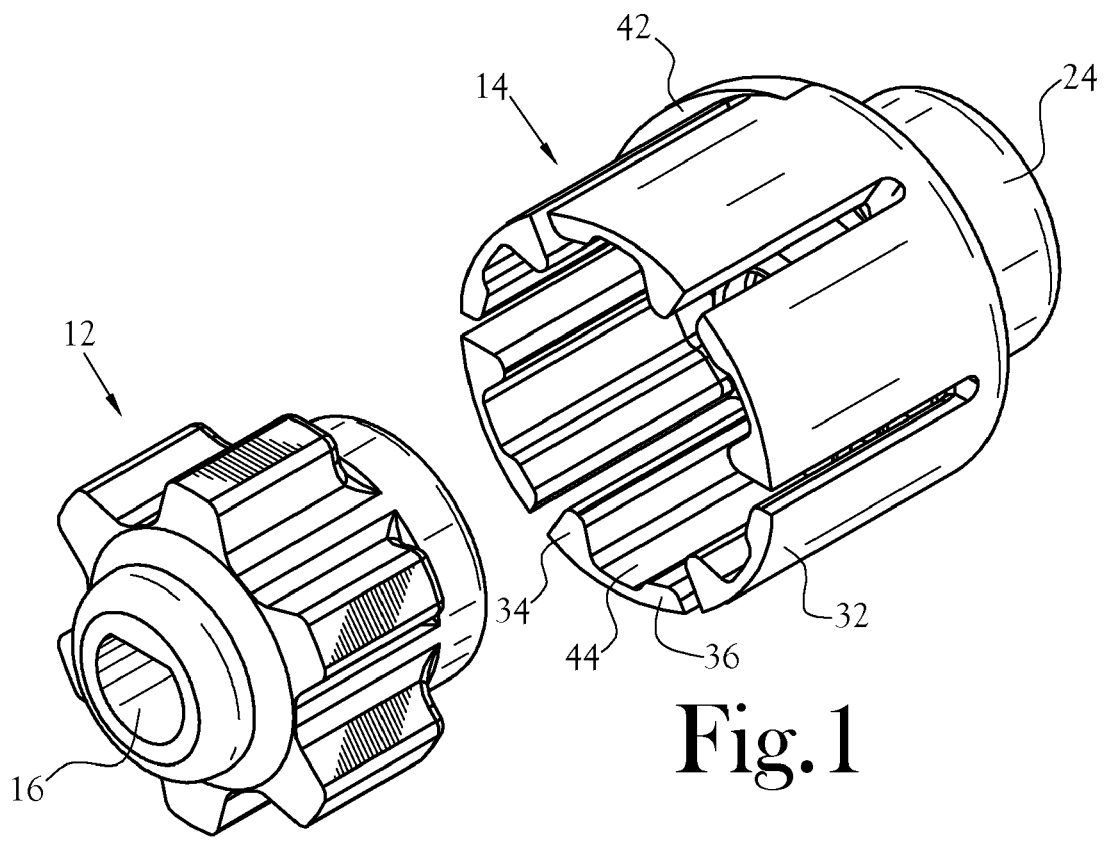
FIG. 1 is an exploded perspective view of a clutch in accordance with the present invention.
Figure 2:
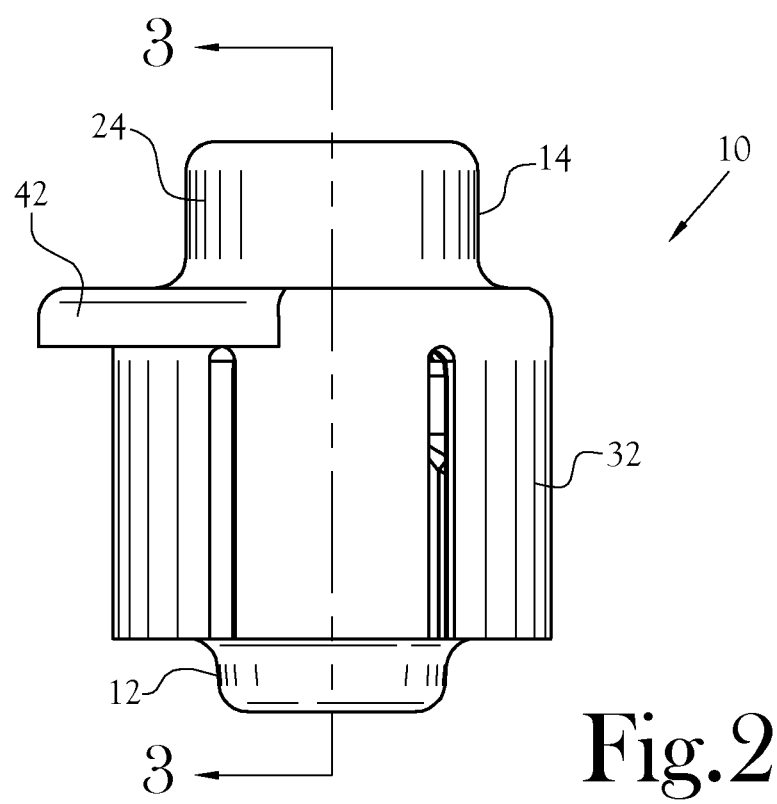
FIG. 2 is an elevation view of a clutch in accordance with the present invention.
Figures 3, 4:
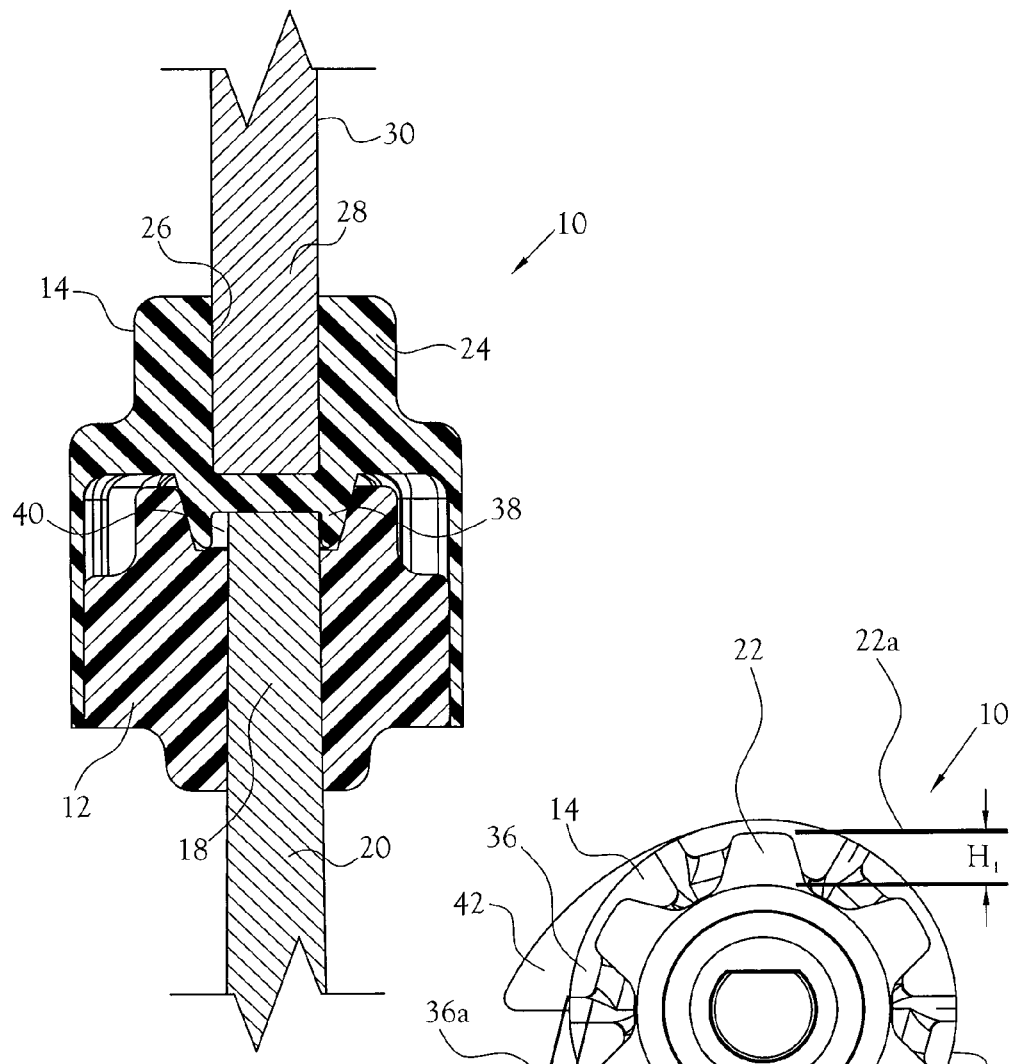
FIG. 3 is a sectional elevation view of the apparatus of FIG. 2.
FIG. 4 is a plan view of the apparatus of FIG. 2.

A clutch apparatus for releasably coupling an axially rotatable driving shaft to an opposed, coaxial driven shaft is disclosed.

Referring to the drawings, in which like-numbers reference like-parts, there is a disclosed a clutch assembly 10, generally comprising a gear 12 and a receptor 14.

The gear 10 defines an axial, non-cylindrical slot 16 adapted to frictionally receive an end portion 18 of an elongated driving shaft 20. The distal end of the driving shaft 20 is secured to a motor, for example. The non-cylindrical slot 16 prevents rotation of the driving shaft 20 relative to the gear 12. The gear 12 includes a plurality of cogs 22 extending radially outwardly. In the depicted embodiment there are six cogs 22 equally spaced circumferentially around the gear 12.

The receptor 14 comprises a hub 24 which defines an axial non-cylindrical slot 26 adapted to frictionally receive an end portion 28 of an elongated driven shaft. The distal end of the driven shaft is secured to a gear, for example in a gearbox adapted to effect motion of a pet door, for example. The non-cylindrical slot 26 prevents rotation of the driven shaft relative to the receptor 14.

The receptor 14 further comprises a plurality of extension segments 32 which extend from the hub 24 in an opposite direction from the driven shaft 30. In the depicted embodiment there are six extension segments. The extension segments 32 are generally parallel to and equivalently spaced from the axis of the driving shaft 20 and the driven shaft 30. The extension segments 32 are spaced apart to define a cavity adapted to matingly receive the gear 12.

Each of the extension segments 32 includes a first elongated shoulder 34 and a second elongated shoulder 36. The first elongated shoulder 34 and the second elongated shoulder 36 are circumferentially spaced apart to define a channel 44 adapted to receive a cog 22 therebetween. The first elongated shoulder 34, the height of which is identified as 34a ($H_2$), contacts more than one half of the side wall of the cog 22. The second elongated shoulder 36, the height of which is identified as 36a ($H_3$), is shorter than the first elongated shoulder and contacts less than on half of the side wall of the cog 22, the height of which is identified as 22a ($H_1$).

The receptor 14 further comprises an axial, cylindrical centering knob 38 adapted to matingly engage an axial, cylindrical centering cavity 40 defined in the gear 12.

The gear 12 and the receptor 14 comprise a material having sufficient rigidity to efficiently transfer rotational energy and also permit the extension segments 32 to flex when the driven shaft encounters resistance to rotation which is greater than a range of normal operation. A material which has been found effective for molding the gear 12 and the receptor 14 is an acetal copolymer sold under the trademark Celcon® by Ticona Engineering Polymers.

In operation, the gear 12, which is frictionally mounted upon the driving shaft 20, is inserted into the cavity defined by the extension segments 32 until the centering knob 38 is received within the centering cavity 40. Each of the cogs 22 of the gear 12 is slidingly received within a channel 44. Rotation of the driving shaft 20 effects rotation of the gear 12. In the case of a pet door application, wherein it is the closing of the door that may encounter unanticipated resistance, as by a tail, for example, rotation of the gear 12 is in a direction to cause contact against the second elongated shoulder 36.

In normal operation, there is a level of resistance to rotation by the receptor from friction, for example. The extension segments 32 are sufficiently rigid to overcome the normal ranges of resistance to rotation. However, if the receptor receives an unanticipated resistance to rotation, as would occur is an object were blocking movement of a pet door, for example, the extension segments 32 are sufficiently flexible to expand outwardly from the gear 12 and allow the cogs 22 to pass under the second elongated shoulders 36 until the cam 42 triggers a switch to stop rotation of the driving shaft 20.

Those skilled in the art will recognize that various and different materials may be used to form the gear 12 and receptor 14. Moreover, the flexibility required in any particular application will vary depending upon the range of rotational resistance which is normal and the acceptable sensitivity of the resistance. In addition to using other materials, it will be recognized that the relative heights of the elongated shoulders, the lengths of the extension segments and the thickness of the gear 12 may all be adjusted to develop more or less flexibility in response to rotational resistance.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A clutch for releasably coupling an axially rotatable driving shaft to a coaxial driven shaft comprising:
   a gear, having a plurality of cogs, coaxially secured to one of said driving shaft or said driven shaft; and
   a receptor coaxially secured to the other of said driving shaft or said driven shaft, said receptor comprising a hub and a plurality of flexible extension segments defining a cavity matingly engaging said gear cogs, each of said extension segments comprising a first elongated shoulder and a second elongated shoulder spaced apart from said first shoulder to define a channel for capturing a portion of a cog therebetween and each of said first elongated shoulders having a height greater than each of said second elongated shoulders;
   whereby, when said driven shaft encounters rotational resistance greater than a range of normal operation, said segments flex out of engagement with said gear cogs to allow rotation of said driving shaft without rotation of said driven shaft.

2. The apparatus of claim 1 wherein said extension segments are generally parallel to said driving shaft and said driven shaft.

3. The apparatus of claim 1 wherein said first elongated shoulder has a height greater than one half of the height of a cog.

4. The apparatus of claim 1 wherein said second elongated shoulder has a height less than one half of the height of said cog.

* * * * *